United States Patent
Ogasawara et al.

(10) Patent No.: US 11,799,119 B2
(45) Date of Patent: Oct. 24, 2023

(54) MANIFOLD, CELL STACK DEVICE, AND ELECTROCHEMICAL CELL

(71) Applicant: NGK INSULATORS, LTD., Nagoya (JP)

(72) Inventors: Noriyuki Ogasawara, Nagoya (JP); Yuki Tanaka, Nagoya (JP); Masayuki Shinkai, Aichi (JP); Hirofumi Kan, Nagoya (JP); Makoto Ohmori, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 443 days.

(21) Appl. No.: 17/080,994

(22) Filed: Oct. 27, 2020

(65) Prior Publication Data
US 2021/0043962 A1 Feb. 11, 2021

Related U.S. Application Data

(63) Continuation of application No. PCT/JP2019/008134, filed on Mar. 1, 2019.

(30) Foreign Application Priority Data

Sep. 7, 2018 (JP) .................................. 2018-168131

(51) Int. Cl.
*H01M 8/2484* (2016.01)
*H01M 8/0258* (2016.01)

(52) U.S. Cl.
CPC ....... *H01M 8/2484* (2016.02); *H01M 8/0258* (2013.01)

(58) Field of Classification Search
CPC ............. H01M 8/2484; H01M 8/0258; H01M 2008/1293; Y02E 60/50
See application file for complete search history.

(56) References Cited

U.S. PATENT DOCUMENTS

| | | | |
|---|---|---|---|
| 10,727,524 B2 | 7/2020 | Ogasawara et al. | |
| 10,862,138 B2 | 12/2020 | Ogasawara et al. | |
| 2011/0065022 A1* | 3/2011 | Min .................... | H01M 8/0252 429/497 |
| 2016/0164128 A1 | 6/2016 | Ono et al. | |

(Continued)

FOREIGN PATENT DOCUMENTS

| | | | |
|---|---|---|---|
| JP | 2002208417 A | * | 7/2002 |
| JP | 2009224299 A | | 10/2009 |

(Continued)

OTHER PUBLICATIONS

International Search Report with English Translation issued in corresponding International Application No. PCT/JP2019/008134 dated May 21, 2019 (5 pages).

(Continued)

*Primary Examiner* — Muhammad S Siddiquee
(74) *Attorney, Agent, or Firm* — FLYNN THIEL, P.C.

(57) ABSTRACT

A manifold includes a first manifold main body and a second manifold main body. The first manifold main body includes a first gas chamber configured to communicate with a first gas channel. The second manifold main body includes a second gas chamber configured to communicate with a second gas channel. The second manifold main body is disposed in the first manifold main body.

15 Claims, 12 Drawing Sheets

(56) References Cited

U.S. PATENT DOCUMENTS

| | | | |
|---|---|---|---|
| 2017/0141426 A1* | 5/2017 | Ohmori | H01M 8/2483 |
| 2017/0155165 A1 | 6/2017 | Ohmori et al. | |
| 2019/0296385 A1* | 9/2019 | Sugihara | H01M 8/2475 |
| 2020/0036015 A1 | 1/2020 | Ogasawara et al. | |
| 2020/0067124 A1 | 2/2020 | Ogasawara et al. | |
| 2020/0083554 A1 | 3/2020 | Ogasawara et al. | |

FOREIGN PATENT DOCUMENTS

| | | |
|---|---|---|
| JP | 6030260 B1 | 11/2016 |
| JP | 201717025 A | 1/2017 |
| JP | 201733630 A | 2/2017 |
| JP | 201873724 A | 5/2018 |
| WO | 2015012372 A1 | 1/2015 |

OTHER PUBLICATIONS

Written Opinion of International Searching Authority issued in corresponding International Application No. PCT/JP2019/008134 dated May 21, 2019 (7 pages).

English Translation of the International Preliminary Report on Patentability, issued in corresponding International Application No. PCT/JP2019/008134, dated Mar. 18, 2021 (15 pages).

* cited by examiner

MANIFOLD, CELL STACK DEVICE, AND ELECTROCHEMICAL CELL

CROSS-REFERENCE TO RELATED APPLICATIONS

This is a continuation of PCT/JP2019/008134, filed Mar. 1, 2019, which claims priority from Japanese Application No. 2018-168131, filed Sep. 7, 2018, the entire contents of which are hereby incorporated by reference.

TECHNICAL FIELD

The present invention relates to a manifold, a cell stack device, and an electrochemical cell.

BACKGROUND ART

A cell stack device includes an electrochemical cell and a manifold. In a cell stack device disclosed in Patent Literature 1, a manifold supports base end portions of fuel cells, which are examples of the electrochemical cell. The manifold includes a gas supply chamber and a gas collection chamber. Specifically, the manifold includes a manifold main body having an internal space, and a partition plate. The partition plate extends from a bottom plate of the manifold main body toward a top plate of the manifold main body, and partitions the internal space of the manifold main body into the gas supply chamber and the gas collection chamber. Note that the gas supply chamber supplies gas to the fuel cell, and the gas collection chamber collects gas discharged from the fuel cell.

CITATION LIST

Patent Literature

Patent Literature 1: Japanese Patent No. 6030260

SUMMARY

Technical Problem

The temperature of a cell stack device increases during operation, and thus a partition plate thermally expands in some cases. Because the partition plate is in contact with the top plate of the manifold, there is a risk that the top plate will deform due to the partition plate undergoing thermal expansion and pressing the top plate. If the top plate deforms, a problem may arise that a crack occurs in a base end portion of an electrochemical cell supported by the top plate or a bonding material for bonding an electrochemical cell to the top plate. Thus, it is preferable to inhibit deformation of the top plate. In view of this, the present invention aims to provide a manifold and a cell stack device capable of inhibiting deformation of a top plate.

Solution to Problem

A manifold according to a first aspect of the present invention is a manifold for supplying gas to an electrochemical cell. The electrochemical cell includes first and second gas channels. The first and second gas channels extend from a base end portion of the electrochemical cell to a leading end portion of the electrochemical cell, and communicate with each other at the leading end portion of the electrochemical cell. The manifold includes a first manifold main body and a second manifold main body. The first manifold main body includes a first gas chamber configured to communicate with the first gas channel. The second manifold main body includes a second gas chamber configured to communicate with the second gas channel. The second manifold main body is disposed in the first manifold main body.

With this configuration, the first gas chamber and the second gas chamber are divided by disposing the second manifold main body in the first manifold main body instead of partitioning the manifold main body into the gas supply chamber and the gas collection chamber by the partition plate as in the conventional manifold. As described above, since the manifold according to the first aspect of the present application does not have the partition plate, it is possible to prevent the deformation of the top plate due to the expansion of the partition plate. Note that the first gas chamber may be the gas supply chamber and the second gas chamber may be the gas collection chamber, or the first gas chamber may be the gas collection chamber and the second gas chamber may be the gas supply chamber.

Preferably, the first manifold includes a first top plate, a first bottom plate, and a first side plate. The first top plate includes a first through hole for communicating between the first gas channel and the first gas chamber. The second manifold includes a second top plate, a second bottom plate, and a second side plate. The second top plate includes a second through hole for communicating between the second gas channel and the second gas chamber.

Preferably, the second top plate is constituted by a part of the first top plate. With this configuration, it is possible to divide the first gas chamber and the second gas chamber by simply attaching a box body including the second side plate and the second bottom plate to the first top plate. Therefore, the manifold having the first gas chamber and the second gas chamber can be easily manufactured.

Preferably, the first bottom plate and the second bottom plate are spaced from each other. With this configuration, the first bottom plate that is the bottom plate of the manifold is exposed only in the first gas chamber and not in the second gas chamber, so that it is possible to inhibit the occurrence of temperature distribution in the first bottom plate. On the other hand, in a conventional manifold that is divided into a gas supply chamber and a gas collection chamber by a partition plate, the bottom plate is exposed in both the gas supply chamber and the gas collection chamber. Because the gas temperature in the gas supply chamber is different from that in the gas collection chamber, temperature distribution occurs in the bottom plate exposed in both the gas supply chamber and the gas collection chamber.

Preferably, the first side plate and the second side plate are spaced from each other.

Preferably, the manifold is configured to supply gas to a plurality of electrochemical cells. The first manifold main body and the second manifold main body extend in an arrangement direction of the electrochemical cells. The second manifold main body is disposed in the first manifold main body so as to be closer to one end portion side in the width direction of the manifold.

Preferably, the manifold is configured to supply gas to a plurality of electrochemical cells. The first manifold main body and the second manifold main body extend in the arrangement direction of the electrochemical cells. The second manifold main body is disposed in the central portion of the first manifold main body in the width direction of the manifold.

Preferably, the manifold further includes a second gas pipe and a second gas seal portion. The second gas pipe passes through the first manifold main body and is attached to the second manifold main body. The second gas seal portion seals the gap between the first manifold main body and the second gas pipe. The second gas seal portion is disposed on the outer surface of the first manifold main body.

A cell stack device according to a second aspect of the present invention includes an electrochemical cell and any of the above-described manifolds. The manifold supports a base end portion of the electrochemical cell. The electrochemical cell includes at least one first gas channel and at least one second gas channel. The first gas channel communicates with the first gas chamber. The first gas channel extends from the base end portion to a leading end portion of the electrochemical cell. The second gas channel communicates with the second gas chamber. The second gas channel extends from the base end portion to the leading end portion of the electrochemical cell. The first gas channel and the second gas channel communicate with each other in the leading end portion of the electrochemical cell.

An electrochemical cell according to a third aspect of the present invention is the electrochemical cell having a leading end portion and a base end portion. This electrochemical cell includes a support substrate, at least one power generation element portion, a plurality of first gas channels, and at least one second gas channel. The power generation element portion is disposed on the support substrate. The first gas channel extends in the support substrate from the base end portion toward the leading end portion. The first gas channels are disposed at both ends in the width direction of the electrochemical cell. The second gas channel extends in the support substrate from the base end portion toward the leading end portion. The second gas channel communicates with the first gas channel at the leading end portion. The second gas channel is disposed in the central portion in the width direction of the electrochemical cell.

Preferably, the total value of the flow channel cross-sectional areas of a plurality of first gas channels is larger than the total value of the flow channel cross-sectional areas of at least one second gas channel.

Preferably, the flow channel cross-sectional area of each first gas channel is larger than the flow channel cross-sectional area of each second gas channel.

Preferably, the number of the first gas channels is larger than the number of the second gas channels.

Preferably, the total value of the flow channel cross-sectional areas of the plurality of first gas channels is smaller than the total value of the flow channel cross-sectional areas of the at least one second gas channel.

Preferably, the flow channel cross-sectional area of each first gas channel is smaller than the flow channel cross-sectional area of each second gas channel.

Preferably, the number of the first gas channels is larger than the number of the second gas channels.

Preferably, the pitch between the adjacent first gas channel and the second gas channel is larger than the pitch between the adjacent first gas channels.

Advantageous Effects

According to the present invention, it is possible to provide a manifold and a cell stack device capable of inhibiting deformation of a top plate.

DESCRIPTION OF EMBODIMENTS

Figure 1:
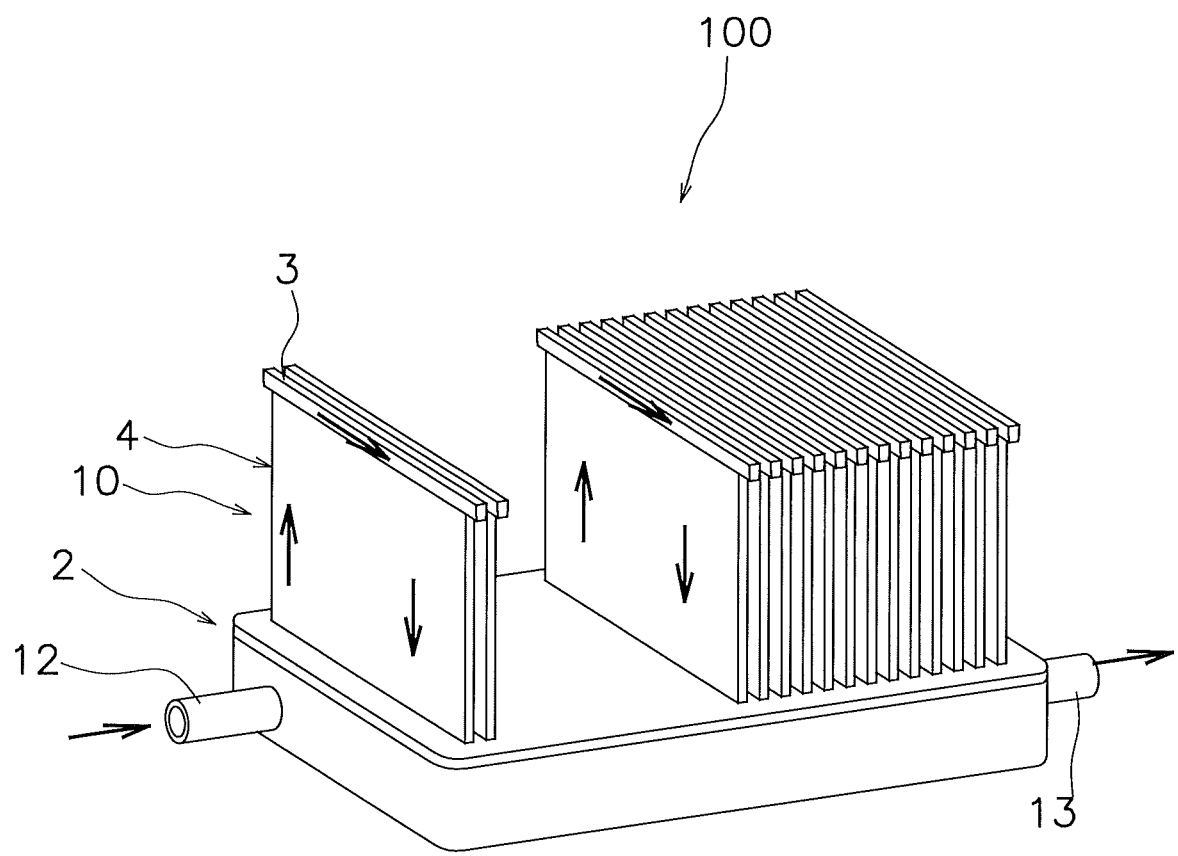
FIG. 1 is a perspective view of a cell stack device.
Figure 2:
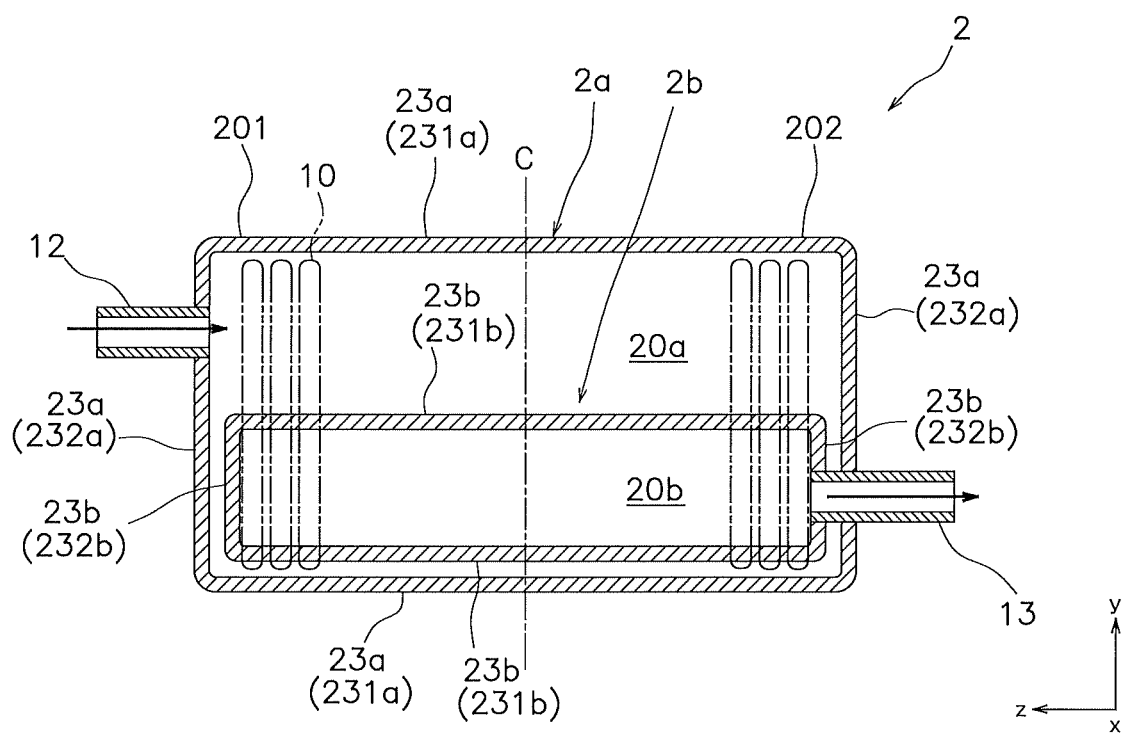
FIG. 2 is a cross-sectional view of a manifold.

Hereinafter, embodiments of a manifold and a cell stack device according to the present invention will be described with reference to the drawings. Note that this embodiment will be described using, as one example of an electrochemical cell, a fuel cell, more specifically, a solid oxide fuel cell (SOFC). FIG. 1 is a perspective view showing a cell stack device, and FIG. 2 is a cross-sectional view of a manifold. Note that some fuel cells are not shown in FIGS. 1 and 2.

Cell Stack Device

As shown in FIG. 1, a cell stack device 100 includes a manifold 2 and a plurality of fuel cells 10.

Manifold

The manifold 2 is configured to supply gas to the fuel cells 10. Also, the manifold 2 is configured to collect gas ejected from the fuel cells 10.

Figure 3:
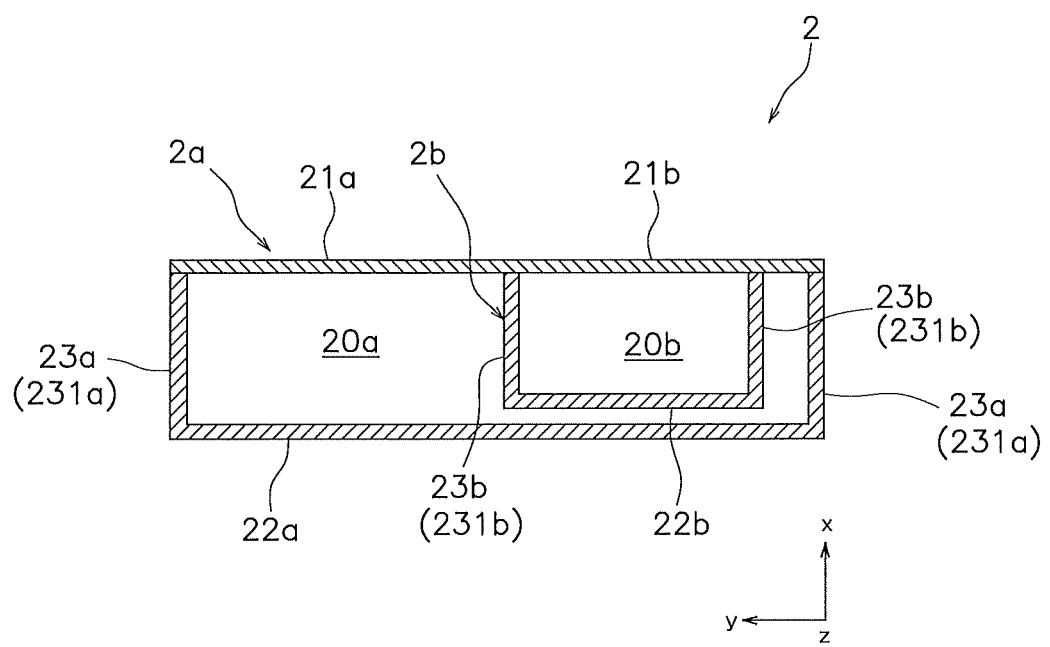
FIG. 3 is a cross-sectional view of the manifold.

As shown in FIGS. 2 and 3, the manifold 2 includes a first manifold main body 2a and a second manifold main body 2b. The first manifold main body 2a includes a first gas chamber 20a. In the present embodiment, the first gas chamber 20a supplies the fuel gas supplied from the gas supply source (not illustrated) to the fuel cell 10. The first gas chamber 20a communicates with a gas outward path 43 of the fuel cell 10 that is described later. The first gas chamber 20a is a space excluding the space occupied by the second manifold 2b in the internal space of the first manifold main body 2a.

The first manifold main body 2a extends in the arrangement direction (the Z-axis direction) of the fuel cells 10. In other words, the first gas chamber 20a extends in the arrangement direction of the fuel cells 10. The manifold 2 includes a first end portion 201 and a second end portion 202 in the arrangement direction of the fuel cells 10. Note that a center line C shown in FIG. 2 indicates a center C of the manifold 2 in the arrangement direction.

Specifically, the first manifold main body 2a includes a first top plate 21a, a first bottom plate 22a, and a first side plate 23a. The first gas chamber 20a is defined by the first top plate 21a, the first bottom plate 22a, and the first side plate 23a. The first manifold main body 2a has a rectangular parallelepiped shape.

For example, the first bottom plate 22a and the first side plate 23a are constituted by one member. The first top plate 21a is joined to an upper end portion of the first side plate 23a. Note that a configuration may be adopted in which the first top plate 21a and the first side plate 23a are constituted by one member, and the first bottom plate 22a is joined to a lower end portion of the first side plate 23a.

The first side plate 23a includes a pair of first side plate portions 231a and a pair of first linking portions 232a. Each of the first side plate portions 231a extends in the arrangement direction (the Z-axis direction) of the fuel cells 10. Each of the first linking portions 232a extends in the width direction (the Y-axis direction) of the fuel cells 10. Each of the first linking portions 232a links end portions of a pair of the first side plate portions 231a.

Figure 4:
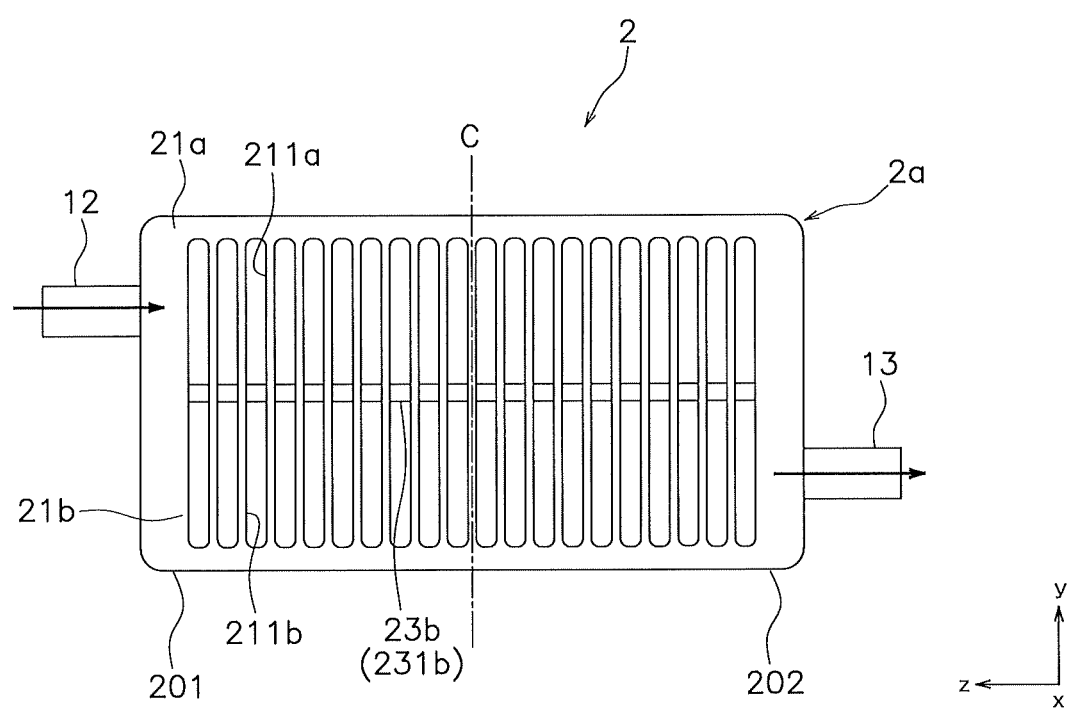
FIG. 4 is a plan view of the manifold.

As shown in FIG. 4, the first top plate 21a has a plurality of first through holes 211a. Each of the first through holes 211a communicates between the first gas chamber 20a and the gas outward path 43. The first through holes 211a are arranged at intervals in a length direction (the Z-axis direction) of the manifold 2. An arrangement direction (the Z-axis direction) of the first through holes 211a is the same as the arrangement direction of the fuel cells 10.

Each of the first through holes 211a extend in the width direction (the Y-axis direction) of the manifold 2. Note that each of the first through holes 211a is respectively formed as a single hole with each of the second through holes 211b, which will be described later.

As shown in FIGS. 2 and 3, the second manifold main body 2b has a second gas chamber 20b. In the present embodiment, the second gas chamber 20b collects the fuel gas discharged from the fuel cell 10. The second gas chamber 20b communicates with a gas return path 44 of the fuel cell 10, which will be described later.

The second manifold main body 2b extends in the arrangement direction (Z-axis direction) of the fuel cells 10. In other words, the second gas chamber 20b extends in the arrangement direction of the fuel cells 10.

The second manifold main body 2b is disposed in the first manifold main body 2a. The second manifold main body 2b is disposed in the first manifold main body 2a so as to be closer to the one end portion in the width direction (Y-axis direction) of the manifold 2. In the present embodiment, the second manifold main body 2b is disposed in the first manifold main body 2a so as to be closer to the right side in FIG. 3.

The second manifold main body 2b includes a second top plate 21b, a second bottom plate 22b, and a second side plate 23b. The second gas chamber 20b is defined by the second top plate 21b, the second bottom plate 22b, and the second side plate 23b. The second manifold main body 2b has a rectangular parallelepiped shape.

For example, the second bottom plate 22b and the second side plate 23b are constituted by one member. The second top plate 21b is joined to an upper end portion of the second side plate 23b. Note that a configuration may be adopted in which the second top plate 21b and the second side plate 23b are constituted by one member, and the second bottom plate 22b is joined to a lower end portion of the second side plate 23b.

The second side plate 23b includes a pair of second side plate portions 231b and a pair of second linking portions 232b. Each of the second side plate portions 231b extends in the arrangement direction (the Z-axis direction) of the fuel cells 10. Each of the second linking portions 232b extends in the width direction (the Y-axis direction) of the fuel cells 10. Each of the second linking portions 232b connects a pair of the second side plate portions 231b each other.

The second bottom plate 22b and the first bottom plate 22a are disposed at intervals. Therefore, the space between the first bottom plate 22a and the second bottom plate 22b is a part of the first gas chamber 20a. Further, the second side plate 23b and the first side plate 23a are disposed at intervals. Therefore, the space between the first side plate 23a and the second side plate 23b is a part of the first gas chamber 20a.

The second top plate 21b is constituted by a part of the first top plate 21a. In other words, a part of the first top plate 21a functions as the second top plate 21b of the second manifold main body 2b. Specifically, the box body including the second bottom plate 22b and the second side plate 23b of the second manifold main body 2b is attached to the first top plate 21a.

As shown in FIG. 4, the second top plate 21b has a plurality of second through holes 211b. Each of the second through holes 211b communicates between the second gas chamber 20b and the gas return path 44. The second through holes 211b are arranged at intervals in the length direction (the Z-axis direction) of the manifold 2. An arrangement direction (the Z-axis direction) of the second through holes 211a is the same as the arrangement direction of the fuel cells 10.

Each of the second through holes 211b extend in the width direction (the Y-axis direction) of the manifold 2. Each of the second through holes 211b communicates with the second gas chamber 20b. Note that each of the second through holes 211b are respectively formed as single holes with the first through holes 211a, as described above.

Figure 5:
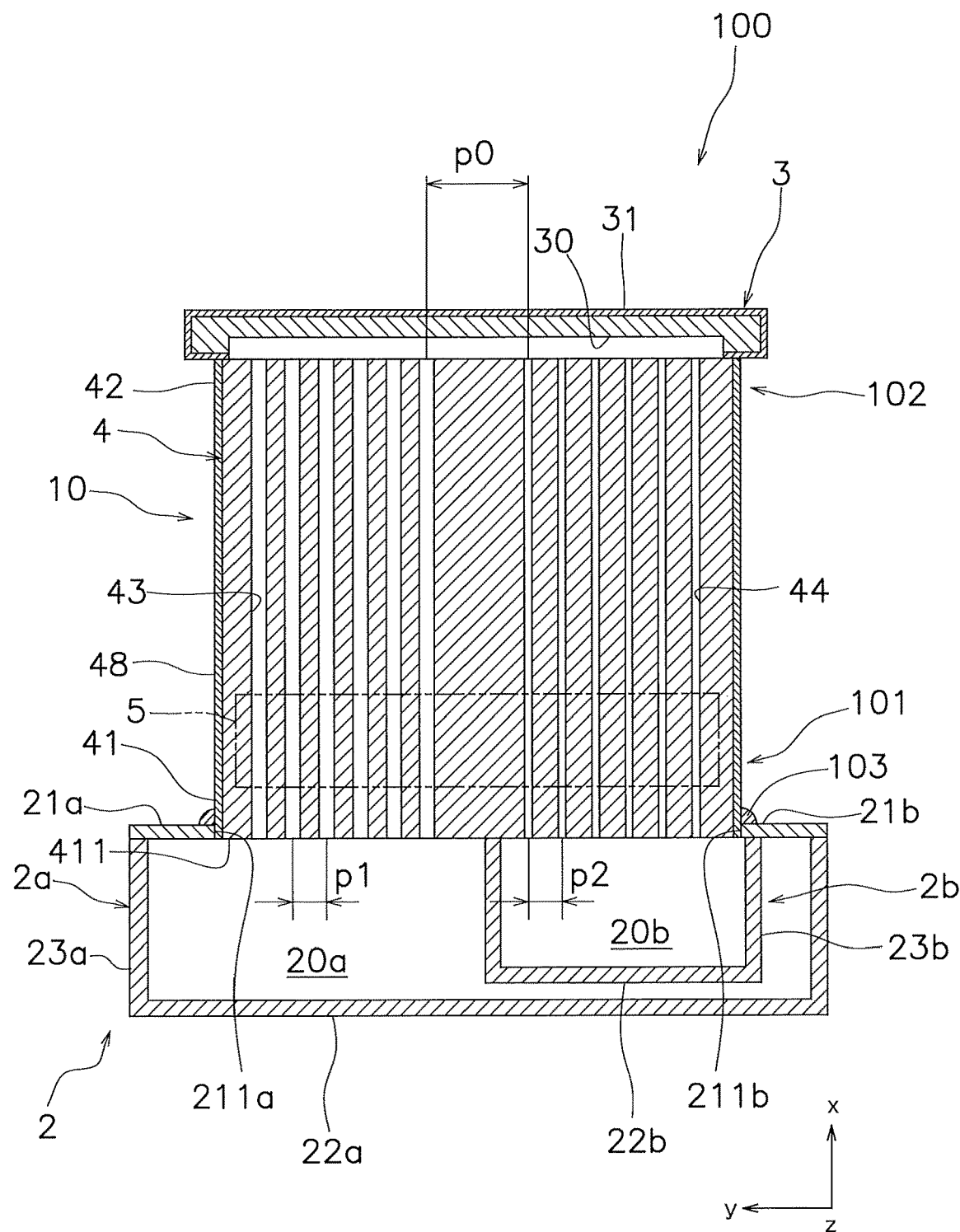
FIG. 5 is a cross-sectional view of the cell stack device.

As shown in FIG. 5, the first and second top plates 21a and 21b support the base end portions 101 of each of the fuel cells 10. Specifically, the bonding material 103 bonds the first and second top plates 21a and 21b and the base end portion 101 of the fuel cell 10. The bonding material 103 is formed into an annular shape extending along the periphery of the base end portion 101 of the fuel cell 10. Note that the first and second top plates 21a and 21b may directly support the fuel cell 10 as in this embodiment, or indirectly support the fuel cell 10 via another member between the fuel cell 10 and the top plates.

First Gas Pipe

As shown in FIG. 2, the first gas pipe 12 is configured to supply gas to the first gas chamber 20a. The first gas pipe 12 communicates with the first gas chamber 20a. Specifically, the first gas pipe 12 communicates with the first gas chamber 20a on the first end portion 201 side with respect to the center C of the manifold 2, in the arrangement direction (the Z-axis direction) of the fuel cells 10.

The first gas pipe 12 is attached to the first manifold main body 2a. Specifically, the first gas pipe 12 is attached to the first linking portion 232a, for example. Note that the first gas pipe 12 supplies gas from the first linking portion 232a in the arrangement direction of the fuel cells 10. That is, the direction in which gas is supplied by the first gas pipe 12 is along the arrangement direction of the fuel cells 10.

Second Gas Pipe

The second gas pipe 13 is configured to collect gas from the second gas chamber 20b. The second gas pipe 13 communicates with the second gas chamber 20b. The second gas pipe 13 communicates with the second gas chamber 20b on the second end portion 202 side with respect to the center C of the manifold 2, in the arrangement direction of the fuel cells 10.

The second gas pipe 13 is attached to the second manifold main body 2b. Specifically, the second gas pipe 13 is attached to the second linking portion 232b, for example. Note that the second linking portion 232b to which the second gas pipe 13 is attached is disposed opposite the first linking portion 232a to which the first gas pipe 12 is attached.

The second gas pipe 13 passes through the first manifold main body 2a. Specifically, the second gas pipe 13 extends through the first side plate 23a of the first manifold main body 2a. Note that the second gas pipe 13 extends through the first linking portion 232a of the first side plate 23a of the first manifold main body 2a.

The second gas pipe 13 collects gas from the second linking portion 232b in the arrangement direction of the fuel cells 10. That is, the direction in which gas is collected by the second gas pipe 13 is along the arrangement direction of the fuel cells 10.

The first gas pipe 12 supplies gas in the direction in which gas is collected by the second gas pipe 13. In other words, the direction in which gas is supplied by the first gas pipe 12 is substantially the same as the direction in which gas is collected by the second gas pipe 13.

Fuel Cell

As shown in FIG. 5, the fuel cell 10 extends upward from the manifold 2. Specifically, the base end portion 101 of the fuel cell 10 is attached to the manifold 2. In this embodiment, the base end portion 101 of the fuel cell 10 refers to a lower end portion, and the leading end portion 102 of the fuel cell 10 refers to an upper end portion.

As shown in FIG. 1, the fuel cells 10 are arranged such that main surfaces of the fuel cells 10 face each other. Also, the fuel cells 10 are arranged at intervals in the length direction (the Z-axis direction) of the manifold 2. That is, the arrangement direction of the fuel cells 10 is along the length direction of the manifold 2. Note that the fuel cells 10 need not be disposed at equal intervals in the length direction of the manifold 2.

Figure 6:
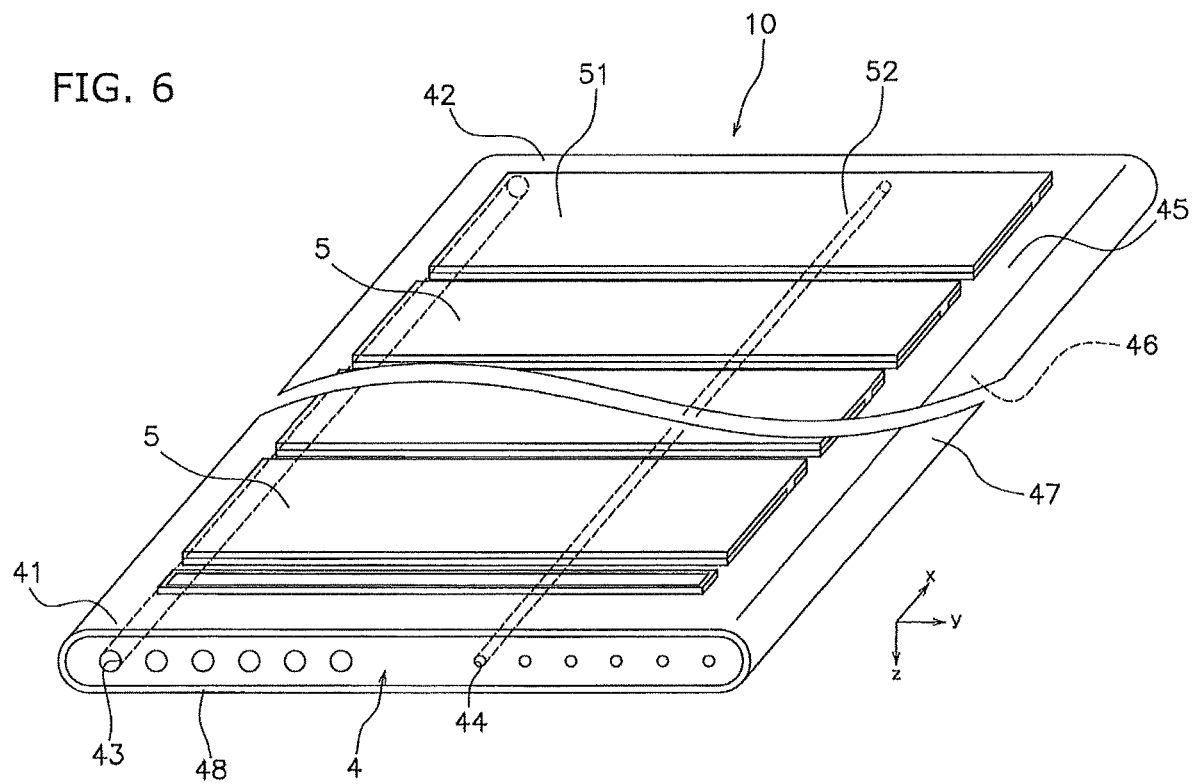
FIG. 6 is a perspective view of a fuel cell.

As shown in FIGS. 5 and 6, the fuel cells 10 each include a support substrate 4, a plurality of power generation element portions 5, and a communication member 3. The power generation element portions 5, and a communication member 3. The power generation element portions 5 are supported on a first main surface 45 and a second main surface 46 of the support substrate 4. Note that the number of power generation element portions 5 formed on the first main surface 45 and the number of power generation element portions 5 formed on the second main surface 46 may be the same or different from each other. Also, the power generation element portions 5 may have different sizes.

Support Substrate

The support substrate 4 extends from the manifold 2 in the vertical direction. Specifically, the support substrate 4 extends upward from the manifold 2. The support substrate 4 has a flat shape, and has a base end portion 41 and a leading end portion 42. The base end portion 41 and the leading end portion 42 are both end portions of the support substrate 4 in the length direction (the X-axis direction). In this embodiment, the base end portion 41 of the support substrate 4 refers to a lower end portion, and the leading end portion 42 of the support substrate 4 refers to an upper end portion.

The base end portion 41 of the support substrate 4 is attached to the manifold 2. For example, the base end portion 41 of the support substrate 4 is attached to the first and second top plates 21a and 21b of the manifold 2 with use of the bonding material 103 or the like. Specifically, the base end portions 41 of the support substrates 4 are inserted into the first and second through holes 211a and 211b formed in the first and second top plates 21a and 21b. Note that the base end portions 41 of the support substrates 4 need not be inserted into the first and second through holes 211a and 211b.

The support substrate 4 includes a plurality of gas outward paths 43 (an example of first gas channels) and a plurality of gas return paths 44 (an example of second gas channels). The gas outward paths 43 extend in the vertical direction in the support substrate 4. That is, the gas outward paths 43 extend in the length direction (the X-axis direction) of the support substrate 4. The gas outward paths 43 pass through the support substrate 4. The gas outward paths 43 are disposed at intervals in the width direction (the Y-axis direction) of the support substrate 4. Note that the gas outward paths 43 are preferably disposed at equal intervals. The length of the support substrate 4 in the width direction (the Y-axis direction) may be longer than the length of the support substrate 4 in the length direction (the X-axis direction).

As shown in FIG. 5, a pitch p1 of adjacent gas outward paths 43 is about 1 to 5 mm, for example. The pitch p1 of adjacent gas outward paths 43 indicates the distance between centers of the gas outward paths 43. For example, an average value of pitches obtained by measuring pitches of gas outward paths 43 in the base end portion 41, the central portion, and the leading end portion 42 may be used as the pitch p1 of gas outward paths 43.

The gas outward paths 43 extend from the base end portion 101 of the fuel cell 10 toward the leading end portion 102. The gas outward paths 43 communicate with the gas supply chamber 20a of the first manifold main body 2a on the base end portion 101 side in a state in which the fuel cell 10 is attached to the manifold 2.

The gas return paths 44 extend in the vertical direction in the support substrate 4. That is, the gas return paths 44 extend in the length direction (the X-axis direction) of the support substrate 4. The gas return paths 44 extend substantially in parallel to the gas outward paths 43.

The gas return paths 44 pass through the support substrate 4. The gas return paths 44 are disposed at intervals in the width direction (the Y-axis direction) of the support substrate 4. Note that the gas return paths 44 are preferably disposed at equal intervals.

A pitch p2 of adjacent gas return paths 44 is about 1 to 5 mm, for example. The pitch p2 of adjacent gas return paths 44 indicates the distance between centers of the gas return paths 44. For example, an average value of pitches obtained by measuring pitches of gas return paths 44 in the base end portion 41, the central portion, and the leading end portion 42 may be used as the pitch p2 of gas return paths 44. Note that the pitch p2 between gas return paths 44 is preferably substantially equal to the pitch p1 between gas outward paths 43.

The gas return paths 44 extend from the base end portion 101 of the fuel cell 10 toward the leading end portion 102. The gas return paths 44 communicate with the second gas chamber 20b of the second manifold main body 2b on the base end portion 101 side in a state in which the fuel cell 10 is attached to the manifold 2.

A pitch p0 of a gas outward path 43 and a gas return path 44 that are adjacent to each other is about 1 to 10 mm, for example. The pitch p0 of the gas outward path 43 and the gas return path 44 that are adjacent to each other indicates the distance between the center of the gas outward path 43 and the center of the gas return path 44. For example, the pitch p0 can be measured on a base end surface 411 of the support substrate 4.

The pitch p0 of the gas outward path 43 and the gas return path 44 that are adjacent to each other is larger than the pitch p1 of adjacent gas outward paths 43. Also, the pitch p0 of the gas outward path 43 and the gas return path 44 that are adjacent to each other is larger than the pitch p2 of adjacent gas return paths 44.

The gas outward paths 43 and the gas return paths 44 communicate with each other on the leading end portion 102 side of the fuel cell 10. Specifically, the gas outward paths 43 and the gas return paths 44 communicate with each other via a communication channel 30 of the communication member 3.

The gas outward paths 43 and the gas return paths 44 are configured such that a pressure loss of gas in the gas outward paths 43 is smaller than a pressure loss of gas in the gas return paths 44. Note that, as in this embodiment, if a plurality of gas outward paths 43 and a plurality of gas return paths 44 are present, the gas outward paths 43 and the gas return paths 44 are configured such that an average value of pressure losses of gas in the gas outward paths 43 is smaller than an average value of pressure losses of gas in the gas return paths 44.

For example, the flow channel cross-sectional area of each gas outward path 43 can be larger than the flow channel cross-sectional area of each gas return path 44. Note that, if the number of gas outward paths 43 is different from the number of gas return paths 44, the sum of the flow channel cross-sectional areas of the gas outward paths 43 can be larger than the sum of the flow channel cross-sectional areas of the gas return paths 44.

The sum of the flow channel cross-sectional areas of the gas return paths 44, although not particularly limited, may be set to about 20% to 95% of the sum of the flow channel cross-sectional areas of the gas outward paths 43. Note that the flow channel cross-sectional area of a gas outward path 43 may be set to about 0.5 to 20 mm$^2$, for example. Also, the flow channel cross-sectional area of a gas return path 44 may be set to about 0.1 to 15 mm$^2$, for example.

Note that the flow channel cross-sectional area of the gas outward path 43 refers to the flow channel cross-sectional area of the gas outward path 43 on the cross-section obtained by cutting the gas outward path 43 along a plane (the YZ plane) orthogonal to a direction (the X-axis direction) in which the gas outward path 43 extends. Also, an average value of the flow channel cross-sectional area at any position on the base end portion 41 side, the flow channel cross-sectional area at any position of the central portion, and the flow channel cross-sectional area at any position on the leading end portion 42 side can be used as the flow channel cross-sectional area of the gas outward path 43.

Also, the flow channel cross-sectional area of the gas return path 44 refers to the flow channel cross-sectional area of the gas return path 44 on the cross-section obtained by cutting the gas return path 44 along a plane (the YZ plane) orthogonal to a direction (the X-axis direction) in which the gas return path 44 extends. Also, an average value of the flow channel cross-sectional area at any position on the base end portion 41 side, the flow channel cross-sectional area at any position of the central portion, and the flow channel cross-sectional area at any position on the leading end portion 42 side can be used as the flow channel cross-sectional area of the gas return path 44.

As shown in FIG. 6, the support substrate 4 includes a first main surface 45 and a second main surface 46. The first main surface 45 and the second main surface 46 face away from each other. The first main surface 45 and the second main surface 46 support the power generation element portions 5. The first main surface 45 and the second main surface 46 are oriented in the thickness direction (the Z-axis direction) of the support substrate 4. Also, side surfaces 47 of the support substrate 4 are oriented in the width direction (the Y-axis direction) of the support substrates 4. The side surfaces 47 may be curved. As shown in FIG. 1, the support substrates 4 are disposed such that the first main surfaces 45 and the second main surfaces 46 face each other.

As shown in FIG. 6, the support substrate 4 supports power generation element portions 5. The support substrate 4 is constituted by a porous material having no electron conductivity. The support substrate 4 is constituted by CSZ (calcia stabilized zirconia), for example. Alternatively, the support substrate 4 may be constituted by NiO (nickel oxide) and YSZ (8YSZ) (yttria-stabilized zirconia), NiO (nickel oxide) and Y$_2$O$_3$ (yttria), or MgO (magnesium oxide) and MgAl$_2$O$_4$ (magnesia alumina spinel). The support substrate 4 has a porosity of about 20% to 60%, for example. The porosity is measured using the Archimedes' method, or through microstructure observation, for example.

The support substrate 4 is covered by a compact layer 48. The compact layer 48 is configured to keep gas that is diffused from the gas outward paths 43 and the gas return paths 44 into the support substrate 4 from being ejected to the outside. In this embodiment, the compact layer 48 covers the first main surface 45, the second main surface 46, and the side surfaces 47 of the support substrate 4. Note that, in this embodiment, the compact layer 48 is constituted by electrolytes 7 and interconnectors 91, which will be described later. The compact layer 48 is more compact than the support substrate 4. For example, the compact layer 48 has a porosity of about 0% to 7%.

Power Generation Element Portion

A plurality of power generation element portions 5 are supported on the first main surface 45 and the second main surface 46 of the support substrate 4. The power generation element portions 5 are arranged in the length direction (the X-axis direction) of the support substrate 4. Specifically, the power generation element portions 5 are disposed at intervals from the base end portion 41 to the leading end portion 42 on the support substrate 4. That is, the power generation element portions 5 are disposed at intervals in the length direction (the X-axis direction) of the support substrate 4. Note that the power generation element portions 5 are connected to each other in series by electrical connection portions 9, which will be described later.

The power generation element portions 5 each extend in the width direction (the Y-axis direction) of the support substrate 4. The power generation element portion 5 is divided into a first portion 51 and a second portion 52 in the width direction of the support substrate 4. Note that there is no strict boundary between the first portion 51 and the second portion 52. For example, in a state in which the fuel cells 10 are attached to the manifold 2, in a longitudinal view (the X-axis view) of the support substrate 4, a portion overlapping the boundary between the first gas chamber 20a and the second gas chamber 20b can be referred to as a boundary portion between the first portion 51 and the second portion 52.

When viewed in the thickness direction (the Z-axis view) of the support substrate 4, the gas outward paths 43 overlap the first portions 51 of the power generation element portions 5. Also, when the viewed in the thickness direction (the Z-axis view) of the support substrate 4, the gas return paths 44 overlap the second portions 52 of the power generation element portions 5. Note that some of the gas outward paths 43 need not overlap the first portions 51. Similarly, some of the gas return paths 44 need not overlap the second portions 52.

Figure 7:
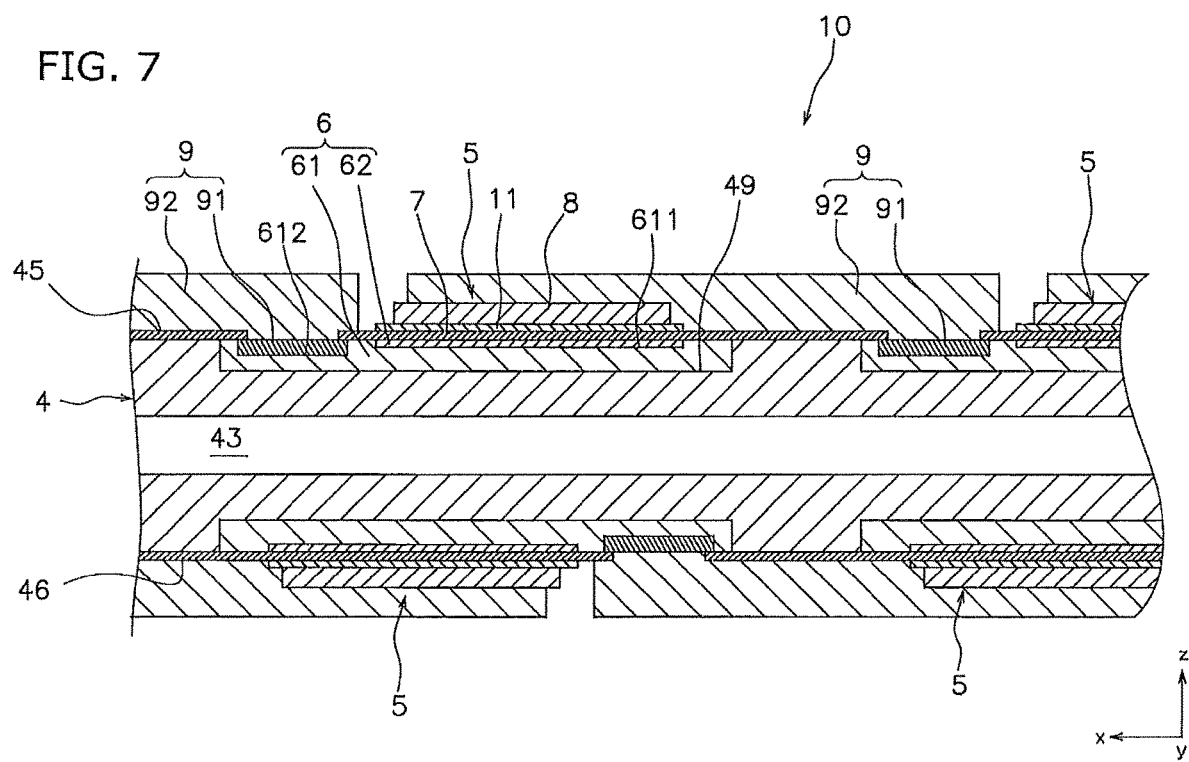
FIG. 7 is a cross-sectional view of the fuel cell.

FIG. 7 is a cross-sectional view of the fuel cell 10 cut along the gas outward path 43. Note that the cross-sectional view of the fuel cell 10 cut along the gas return path 44 is the same as that in FIG. 7, except that the flow channel cross-sectional area of the gas return path 44 is different from that in FIG. 7.

The power generation element portions 5 include fuel electrodes 6, electrolytes 7, and air electrodes 8. Also, the power generation element portions 5 further include reaction preventing films 11. The fuel electrode 6 is a sintered body constituted by a porous material having electron conductivity. The fuel electrode 6 includes a fuel electrode current collector portion 61 and a fuel electrode active portion 62.

The fuel electrode current collector portion 61 is disposed in a recess 49. The recess 49 is formed in the support substrate 4. Specifically, the recess 49 is filled with the fuel electrode current collector portion 61, and the fuel electrode current collector portion 61 has the same outer shape as the recess 49. The fuel electrode current collector portions 61 each have a first recess 611 and a second recess 612. The fuel electrode active portion 62 is disposed in the first recess 611. Specifically, the first recess 611 is filled with the fuel electrode active portion 62.

The fuel electrode current collector portion 61 may be constituted by NiO (nickel oxide) and YSZ (8YSZ) (yttria-stabilized zirconia), for example. Alternatively, the fuel electrode current collector portion 61 may also be constituted by NiO (nickel oxide) and $Y_2O_3$ (yttria), or NiO (nickel oxide) and CSZ (calcia stabilized zirconia). The fuel electrode current collector portion 61 has a thickness of about 50 to 500 μm and the recess 49 have a depth of about 50 to 500 μm.

The fuel electrode active portion 62 may be constituted by NiO (nickel oxide) and YSZ (8YSZ) (yttria-stabilized zirconia), for example. Alternatively, the fuel electrode active portion 62 may also be constituted by NiO (nickel oxide) and GDC (gadolinium doped ceria). The fuel electrode active portion 62 has a thickness of 5 to 30 μm.

The electrolyte 7 is disposed covering the fuel electrode 6. Specifically, the electrolyte 7 extends in the length direction from one interconnector 91 to another interconnector 91. That is, the electrolytes 7 and the interconnectors 91 are disposed in an alternating manner in the length direction (the X-axis direction) of the support substrate 4. Also, the electrolytes 7 cover the first main surface 45, the second main surface 46, and the side surfaces 47 of the support substrate 4.

The electrolyte 7 is more compact than the support substrate 4. For example, the electrolyte 7 has a porosity of about 0% to 7%. The electrolyte 7 is a sintered body constituted by a compact material having ionic conductivity and no electron conductivity. The electrolyte 7 may be constituted by YSZ (8YSZ) (yttria-stabilized zirconia), for example. Alternatively, the electrolyte 7 may also be constituted by LSGM (lanthanum gallate). The electrolyte 7 has a thickness of about 3 to 50 μm, for example.

The reaction preventing film 11 is a sintered body constituted by a compact material. The reaction preventing film 11 has a shape that is substantially the same as that of the fuel electrode active portion 62, in a plan view. The reaction preventing film 11 is disposed at a position corresponding to the fuel electrode active portion 62 via the electrolyte 7. The reaction preventing film 11 is provided in order to suppress the occurrence of a phenomenon in which a reaction layer with large electric resistance is formed at an interface between the electrolyte 7 and the air electrode 8 through a reaction between YSZ in the electrolyte 7 and Sr in the air electrode 8. The reaction preventing film 11 may be constituted by GDC=(Ce, Gd)$O_2$ (gadolinium doped ceria), for example. The reaction preventing film 11 has a thickness of about 3 to 50 μm, for example.

The air electrode 8 is disposed on the reaction preventing film 11. The air electrode 8 is a sintered body constituted by a porous material having electron conductivity. The air electrode 8 may be constituted by LSCF=(La, Sr) (Co, Fe)$O_3$ (lanthanum strontium cobalt ferrite), for example. Alternatively, the air electrode 8 may also be constituted by LSF=(La, Sr)FeO$_3$ (lanthanum strontium ferrite), LNF=La(Ni, Fe)O$_3$ (lanthanum nickel ferrite), LSC=(La, Sr)CoO$_3$ (lanthanum strontium cobaltite), or the like. Also, the air electrode 8 may be constituted by two layers of a first layer (inner layer) constituted by LSCF and a second layer (outer layer) constituted by LSC. The air electrode 8 has a thickness of 10 to 100 μm, for example.

Electrical Connection Portion

An electrical connection portion 9 is configured to electrically connect adjacent power generation element portions 5. The electrical connection portion 9 includes an interconnector 91 and an air electrode current collector film 92. The interconnector 91 is disposed in the second recess 612. Specifically, the interconnector 91 is embedded in the second recess 612 (the second recess 612 is filled with the interconnector 91). The interconnector 91 is a sintered body constituted by a compact material having electron conductivity. The interconnector 91 is more compact than the support substrate 4. For example, the interconnector 91 has a porosity of about 0% to 7%. The interconnector 91 may be constituted by LaCrO$_3$ (lanthanum chromite), for example. Alternatively, the interconnector 91 may also be constituted by (Sr, La)TiO$_3$ (strontium titanate). The interconnector 91 has a thickness of 10 to 100 μm, for example.

The air electrode current collector film 92 is disposed to extend between the interconnector 91 and the air electrode 8 of adjacent power generation element portions 5. For example, the air electrode current collector film 92 is disposed such that the air electrode 8 of the power generation element portion 5 disposed on the left side in FIG. 7 and the interconnector 91 of the power generation element portion 5 disposed on the right side in FIG. 7 are electrically connected to each other. The air electrode current collector film 92 is a sintered body constituted by a porous material having electron conductivity.

The air electrode current collector film 92 may be constituted by LSCF=(La, Sr) (Co, Fe)O$_3$ (lanthanum strontium cobalt ferrite), for example. Alternatively, the air electrode current collector film 92 may also be constituted by LSC=(La, Sr)CoO$_3$ (lanthanum strontium cobaltite). Alternatively, the air electrode current collector film 92 may also be constituted by Ag (silver) or Ag—Pd (a silver palladium alloy). The air electrode current collector film 92 has a thickness of about 50 to 500 μm, for example.

Communication Member

As shown in FIG. 5, the communication member 3 is attached to the leading end portion 42 of the support substrate 4. Also, the communication member 3 includes the communication channel 30 for communicating between the gas outward paths 43 and the gas return paths 44. Specifically, the communication channel 30 communicates between the gas outward paths 43 and the second gas channels 44. The communication channel 30 is constituted by a space extending from the gas outward paths 43 to the gas return paths 44. The communication member 3 is preferably joined to the support substrate 4. Also, the communication member 3 is preferably formed as a single body with the support substrate 4. The number of communication channels 30 is smaller than the number of first gas channels 43. In this embodiment, a plurality of gas outward paths 43 and a plurality of gas return paths 44 communicate with each other by only one communication channel 30.

The communication member 3 is a porous member, for example. Also, the communication member 3 includes a compact layer 31 constituting the outer surface thereof. The compact layer 31 is more compact than the main body of the communication member 3. For example, the compact layer 31 has a porosity of about 0% to 7%. This compact layer 31 may be made of the same material as the communication member 3, a material used in the above-described electrolyte 7, crystallized glass, or the like.

Method for Generating Power

In the cell stack device 100 configured as described above, fuel gas such as hydrogen gas is supplied to the first gas chamber 20a of the first manifold main body 2a, and the fuel cells 10 are exposed to gas containing oxygen, such as air. Then, a chemical reaction indicated by Equation (1) below occurs in the air electrode 8, a chemical reaction indicated by Equation (2) occurs in the fuel electrode 6, and a current flows.

$$(1/2)\cdot O_2 + 2e^- \rightarrow O^{2-} \tag{1}$$

$$H_2 + O^{2-} \rightarrow H_2O + 2e^- \tag{2}$$

Specifically, fuel gas supplied from the first gas pipe 12 to the first gas chamber 20a flows through the gas outward paths 43 of the fuel cells 10, and the chemical reaction indicated by Equation (2) above occurs in the fuel electrodes 6 of the power generation element portions 5. Unreacted fuel gas in the fuel electrodes 6 leaves the gas outward paths 43 and is supplied to the gas return paths 44 via the communication channel 30 of the communication member 3. Then, fuel gas supplied to the gas return paths 44 undergoes the chemical reaction indicated by Equation (2) above in the fuel electrodes 6 again. Unreacted fuel gas in the fuel electrodes 6 in a process in which fuel gas flows through the gas return paths 44 is collected in the second gas chamber 20b of the second manifold main body 2b. Then, the second gas pipe 13 collects gas from the second gas chamber 20b.

Variations

Although embodiments of the present invention have been described above, the present invention is not limited thereto, and various variations can be made without departing from the spirit of the present invention.

Variation 1

Figure 8:
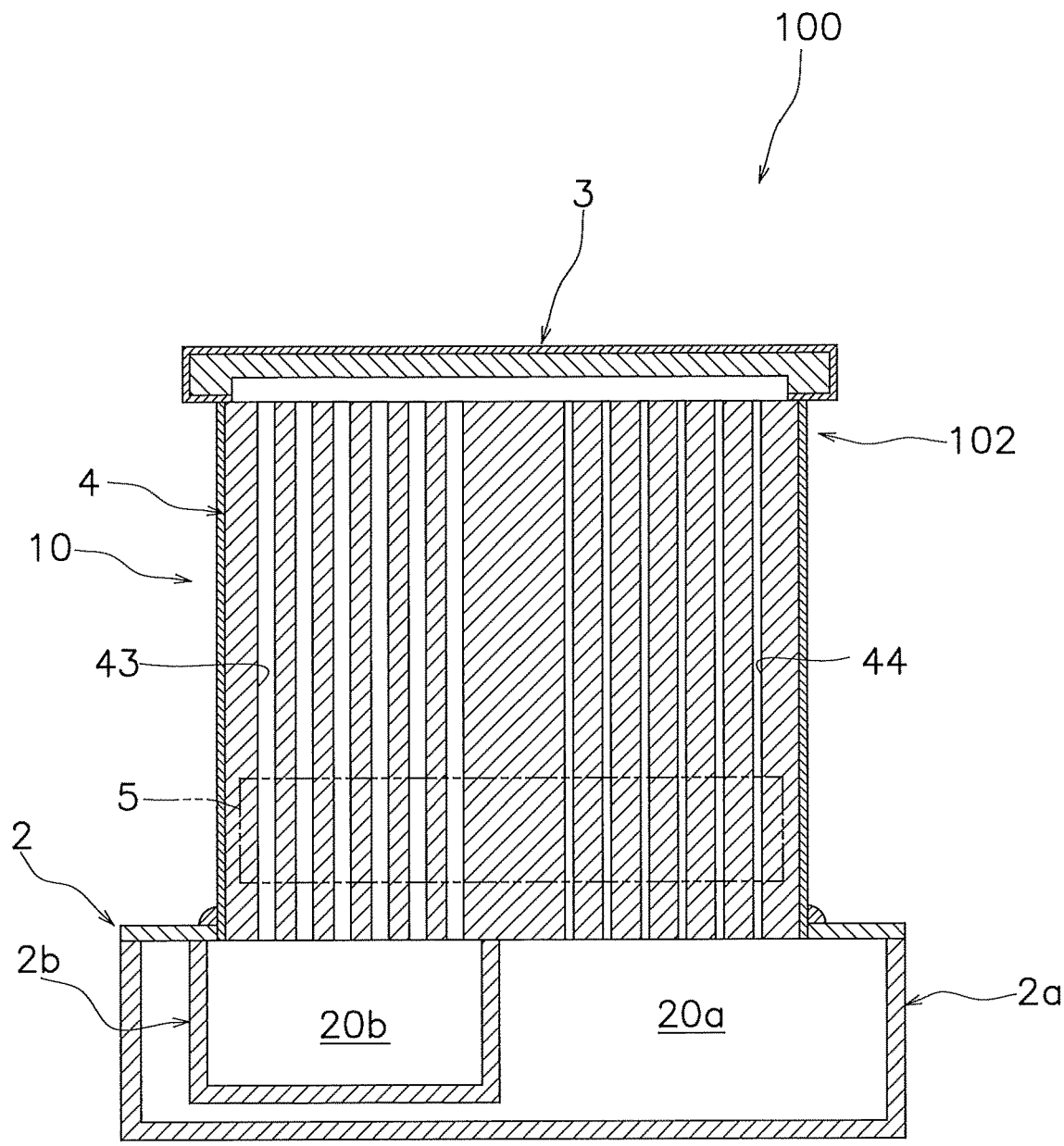
FIG. 8 is a cross-sectional view of a cell stack device according to a variation.

Although in the above-described embodiment, the gas outward path 43 corresponds to the first gas channel of the present invention and the gas return path 44 corresponds to the second gas channel of the present invention, the present invention is not limited thereto. For example, as illustrated in FIG. 8, the gas outward path 43 may correspond to the second gas channel of the present invention, and the gas return path 44 may correspond to the first gas channel of the present invention. That is, the gas outward path 43 communicates with the second gas chamber 20b, and the gas return path 44 communicates with the first gas chamber 20a. In this case, the fuel gas is supplied from the second gas pipe 13 to the second gas chamber 20b. Then, the second gas chamber 20b supplies the fuel gas to the fuel cell 10. The first gas chamber 20a collects the unreacted fuel gas discharged from the fuel cell 10. Then, the fuel gas is discharged from the first gas chamber 20a via the first gas pipe 12.

Variation 2

Figure 9:
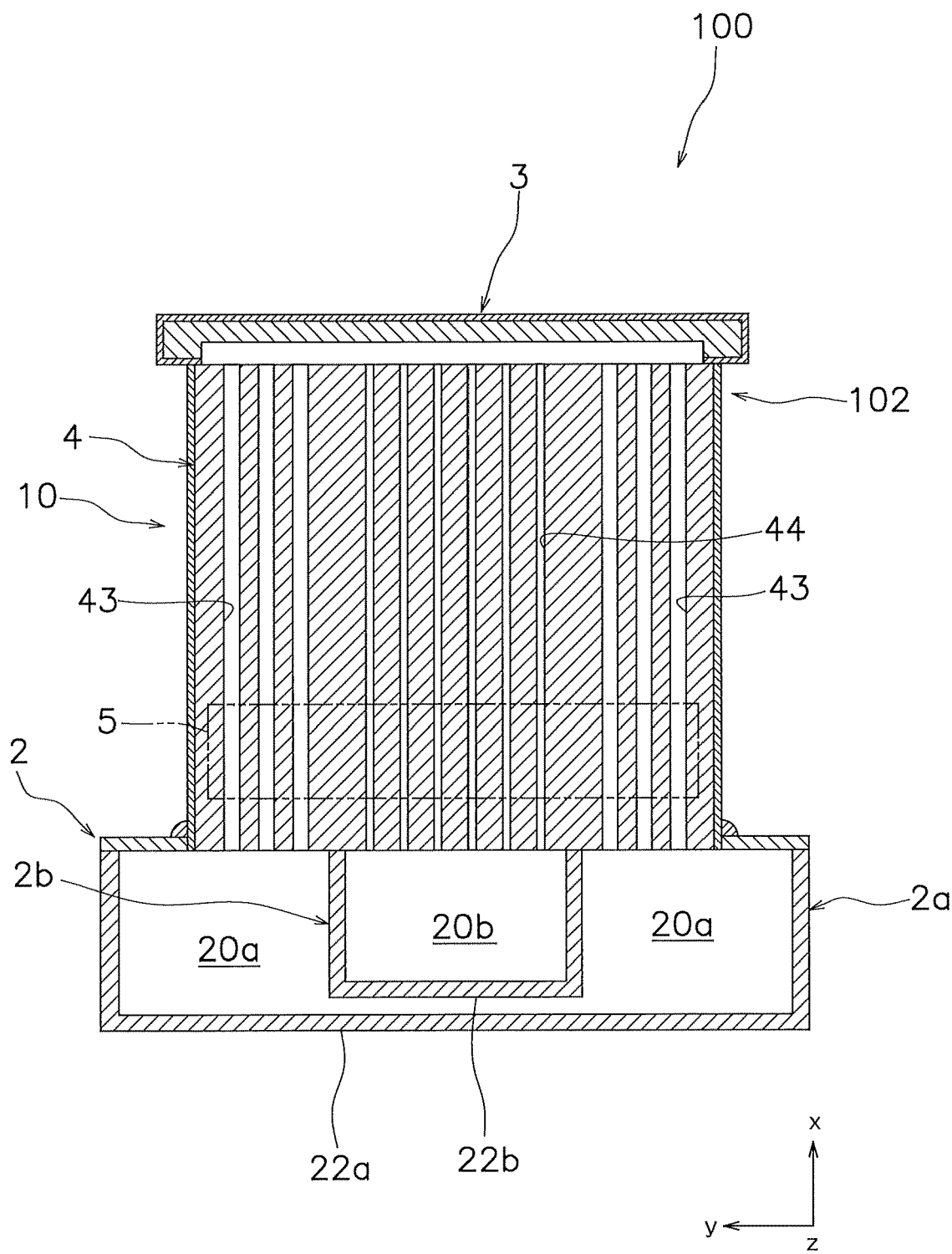
FIG. 9 is a cross-sectional view of the cell stack device according to a further variation.

Although in the above-described embodiment, the second manifold main body 2b is disposed in the first manifold main body 2a close to one end side in the width direction of the manifold 2, the present invention is not limited thereto. For example, as illustrated in FIG. 9, the second manifold main body 2b may be disposed in the central portion of the first manifold main body 2a in the width direction of the manifold 2. Note that the second manifold main body 2b need not be disposed such that the center of the second manifold main body 2b and the center of the first manifold main body 2a are at the completely overlapped position in the width direction of the manifold 2, and the center of the main body 2b may be displaced from the center of the first manifold main body 2a.

The first manifold main body 2a has a pair of first gas chambers 20a. The pair of first gas chambers 20a are disposed in the first manifold main body 2 at both end portions in the width direction (Y-axis direction) of the manifold 2. The second gas chamber 20b is disposed between the pair of first gas chambers 20a in the width direction of the manifold 2. Note that the pair of first gas chambers 20a may or may not communicate with each other. In the variation 2, the pair of first gas chambers 20a communicate with each other through the space between the first bottom plate 22a and the second bottom plate 22b.

In addition, in the fuel cell 10, a plurality of first gas channels (gas outward path 43 in the variation 2) communicating with the first gas chamber 20a are disposed at both end portions in the width direction (Y-axis direction) of the fuel cell 10. Then, the second gas channel (the gas return path 44 in the variation 2) communicating with the second gas chamber 20b is disposed in the central portion in the width direction of the fuel cell 10.

In the variation 2, the first gas channel is the gas outward path 43 and the second gas channel is the gas return path 44. Therefore, the first gas chamber 20a supplies the fuel gas supplied from the fuel gas supply source to the fuel cell 10. The second gas chamber 20b also collects unreacted fuel gas discharged from the fuel cell 10.

The total value of the flow channel cross-sectional areas of a plurality of gas outward paths 43 can be larger than the total value of the flow channel cross-sectional areas of a plurality of gas return paths 44. In this case, the flow channel cross-sectional areas of each gas outward path 43 may be larger than the flow channel cross-sectional areas of each gas return path 44, or the number of gas flow paths 43 may be larger than the number of gas return paths 44, for example.

Note that the total value of the flow channel cross-sectional areas of a plurality of gas outward paths 43 may be smaller than the total value of the flow channel cross-sectional areas of a plurality of gas return paths 44. In this case, the flow channel cross-sectional areas of each gas outward path 43 may be smaller than the flow channel cross-sectional areas of each gas return path 44, or the number of gas flow paths 43 may be smaller than the number of gas return paths 44, for example.

Also in the variation 2, the pitch between the gas outward paths 43 and the gas return paths 44 adjacent to each other is larger than the pitch of the gas outward paths 43 adjacent to each other, as in the above embodiment. Further, the pitch between the gas outward paths 43 and the gas return paths 44 adjacent to each other is larger than the pitch between the gas return paths 44 adjacent to each other.

Figure 10:
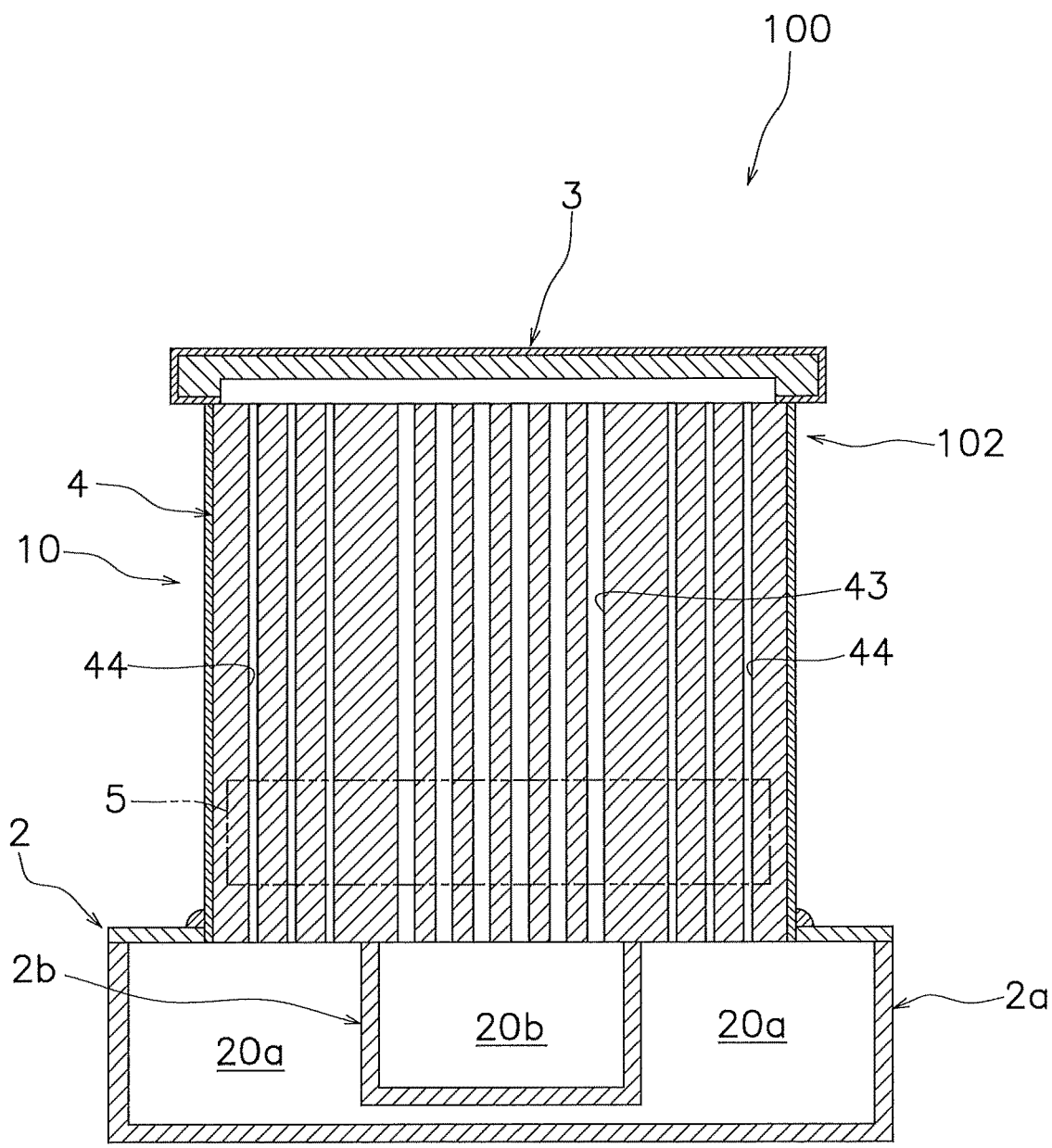
FIG. 10 is a cross-sectional view of a variation of the cell stack device according to the variation of FIG. 9.

Note that in the variation 2, as illustrated in FIG. 10, the fuel gas may be supplied from the fuel gas supply source to the second gas chamber 20b, and the unreacted fuel gas discharged from the fuel cell 10 may be collected in the first gas chamber 20a. In this case, the first gas channel communicating with the first gas chamber 20a is the gas return path 44, and the second gas channel communicating with the second gas chamber 20b is the gas outward path 43.

Variation 3

Figure 11:
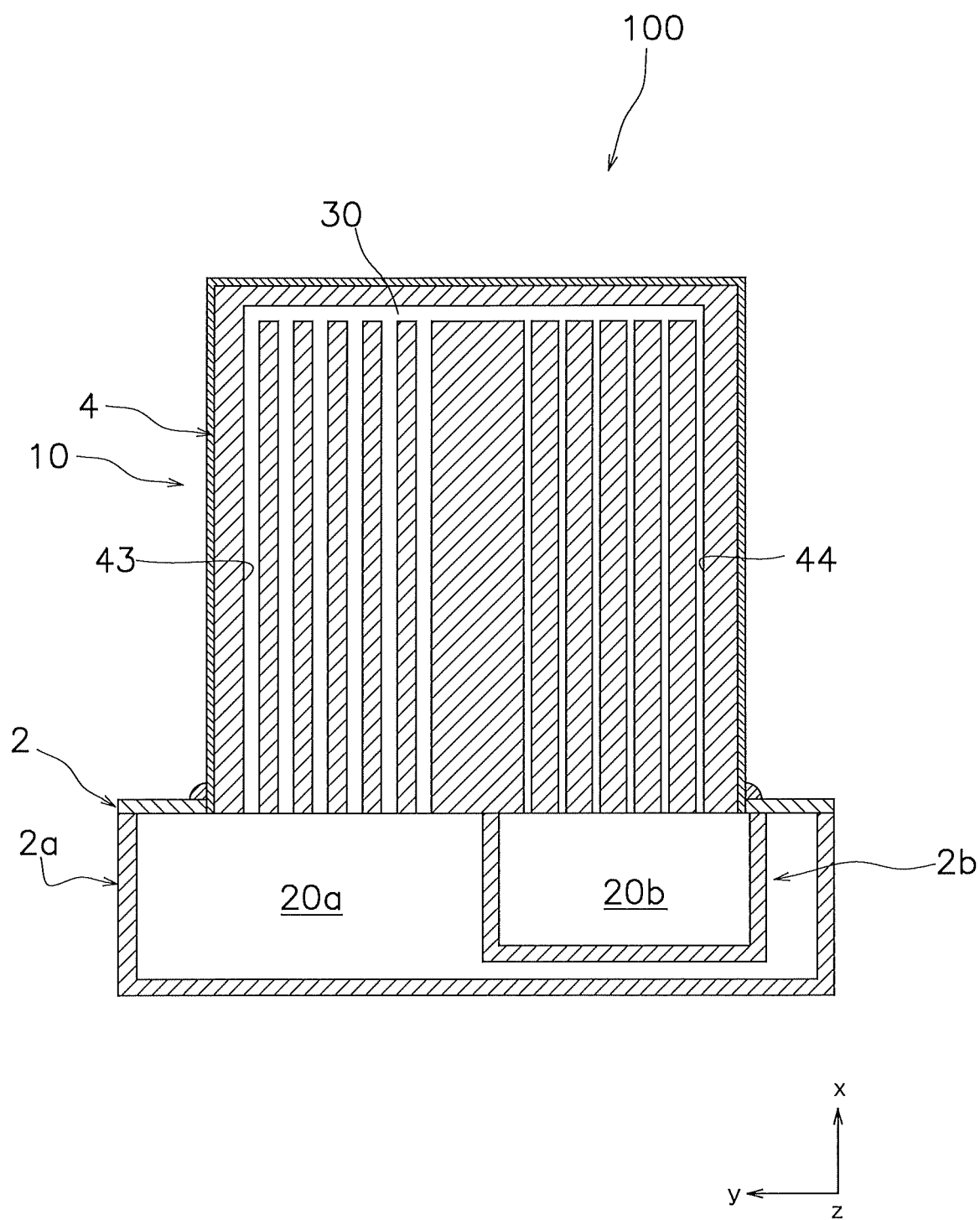
FIG. 11 is a cross-sectional view of the cell stack device according to according to a further variation.

Although in the above-described embodiment, the gas outward path 43 and the gas return path 44 communicate with each other by the communication channel 30 that the communication member 3 includes, the configuration is not limited thereto. For example, as illustrated in FIG. 11, the support substrate 4 may include the communication channel 30 inside. In this case, the cell stack device 100 need not include the communication member 3. The communication channel 30 formed in the support substrate 4 communicates between the gas outward path 43 and the gas return path 44.

Variation 4

The support substrate 4 includes a plurality of gas outward paths 43 in the above-described embodiment, but may include only one gas outward path 43. Similarly, the support substrate 4 includes a plurality of gas return path 44, but may include only one gas return path 44.

Variation 5

Figure 12:
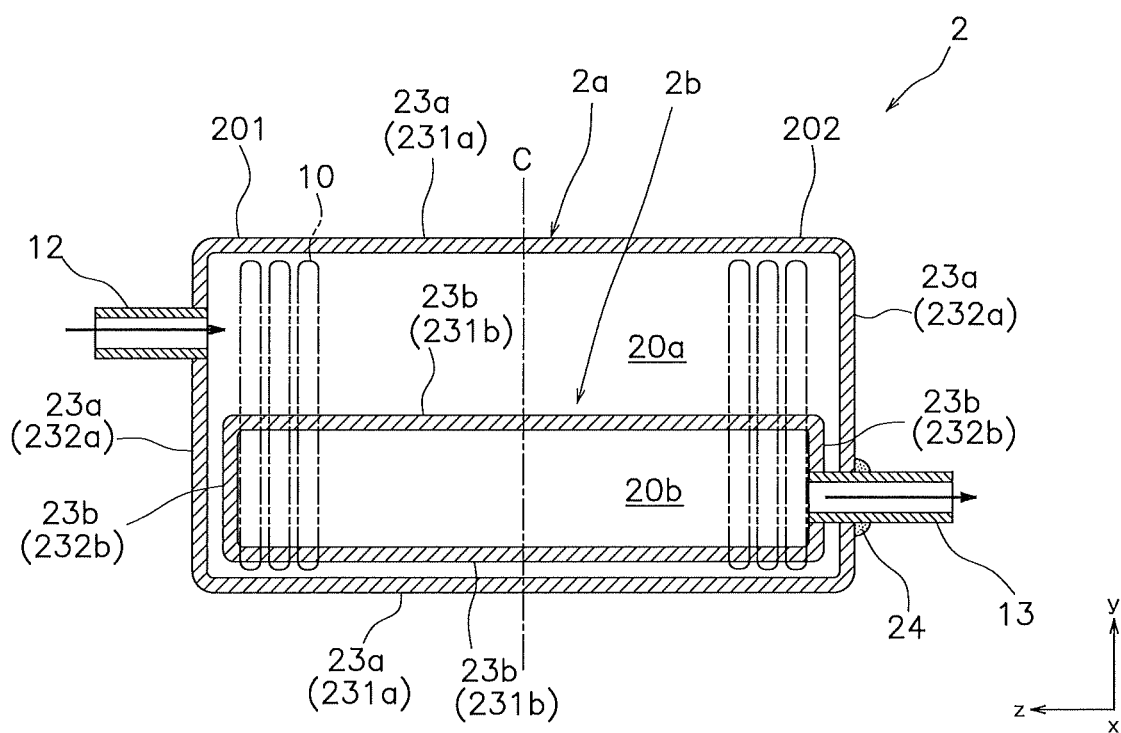
FIG. 12 is a cross-sectional view of a manifold according to a further variation.

As illustrated in FIG. 12, the manifold 2 may include a gas seal portion 24. The gas seal portion 24 seals the gap between the first side plate 23a and the second gas pipe 13. Specifically, the gas seal portion 24 seals the gap between the inner wall surface of the through hole of the first side plate 23a and the outer peripheral surface of the second gas pipe 13. The second gas seal portion 24 is formed in an annular shape along the outer peripheral surface of the second gas pipe 13.

The second gas seal portion 24 is disposed on the outer surface of the first manifold main body 2a. Specifically, the second gas seal portion 24 is disposed on the outer side surface of the first side plate 23a. The gas seal portion 24 can be constituted by glass, ceramics, or a brazing material, for example. Further, the gas seal portion 24 can be constituted by a welded portion.

Variation 6

Although the first and second top plates 21a and 21b of the manifold 2 are oriented upward and the first and second bottom plates 22a and 22b are oriented downward in the above-described embodiment, the orientation of the manifold 2 is not limited thereto. For example, the first and second top plates 21a and 21b of the manifold 2 may be oriented downward, and the first and second bottom plates 22a and 22b may be oriented upward. In this case, the fuel cells 10 extend downward from the first and second top plates 231.

Variation 7

Although the fuel cells 10 of the above-described embodiment are so-called horizontal-stripe type fuel cells in which the power generation element portions 5 are arranged in the length direction (the X-axis direction) of the support substrate 4, the configuration of the fuel cells 10 is not limited thereto. For example, the fuel cells 10 may be so-called vertical-stripe type fuel cells in which one power generation element portion 5 is supported on the first main surface 45 of the support substrate 4. In this case, one power generation element portion 5 may be or need not be supported on the second main surface 46 of the support substrate 4.

Variation 8

Although an electrochemical cell is used as a solid oxide fuel cell (SOFC) in the above-described embodiment, the present invention is not limited thereto. For example, an electrochemical cell can also be used as a solid oxide electrolysis cell (SOEC).

The invention claimed is:

1. A manifold for supplying gas to an electrochemical cell, the electrochemical cell including first and second gas channels extending from a base end portion to a leading end portion of the electrochemical cell and communicating with each other at the leading end portion, the manifold comprising:
   a first manifold main body including a first gas chamber, the first gas chamber being configured to communicate with the first gas channel, the first manifold main body including a first top plate, a first bottom plate and a first side plate, the first top plate including a first through hole for permitting communication between the first gas channel and the first gas chamber; and
   a second manifold main body including a second gas chamber, the second gas chamber being configured to communicate with the second gas channel, the second manifold main body being disposed in the first manifold main body, the second manifold main body including a second top plate, a second bottom plate and a second side plate, the second top plate including a second through hole for permitting communication between the second gas channel and the second gas chamber, the first bottom plate of the first manifold main body and the second bottom plate of the second manifold main body being spaced from one another and being disposed in facing relation with one another.

2. The manifold according to claim 1, wherein the second top plate is constituted by a part of the first top plate.

3. The manifold according to claim 1, wherein the first side plate and the second side plate are spaced from each other.

4. The manifold according to claim 1, wherein:
   the manifold is configured to supply gas to a plurality of the electrochemical cells;
   the first manifold main body and the second manifold main body extend along an arrangement direction of the electrochemical cells; and
   the first manifold main body has two end portions spaced from one another in a width direction of the manifold, and the second manifold main body is disposed in the first manifold main body closer to one of the end portions of the first manifold main body.

5. The manifold according to claim 1, wherein:
   the manifold is configured to supply gas to a plurality of the electrochemical cells;
   the first manifold main body and the second manifold main body extend along an arrangement direction of the electrochemical cells; and
   the second manifold main body is disposed in a central portion of the first manifold main body in a width direction of the manifold.

6. The manifold according to claim 1, further comprising:
   a second gas pipe passing through the first manifold main body, the second gas pipe being attached to the second manifold main body; and
   a second gas seal portion sealing the gap between the first manifold main body and the second gas pipe, the second gas seal portion being disposed on an outer surface of the first manifold main body.

7. A cell stack device comprising:
   an electrochemical cell; and
   the manifold according to claim 1, the manifold supporting a base end portion of the electrochemical celli;
   the electrochemical cell including at least one first gas channel and at least one second gas channel, the at least one first gas channel communicating with the first gas chamber, the at least one first gas channel extending from the base end portion to a leading end portion of the electrochemical cell, the at least one second gas channel communicating with the second gas chamber, the at least one second gas channel extending from the base end portion to the leading end portion of the electrochemical cell, the at least one second gas channel communicating with the at least one first gas channel in the leading end portion of the electrochemical cell.

8. An electrochemical cell comprising:
a leading end portion, a base end portion, two end portions spaced from one another in a width direction of the electrochemical cell and a central portion;
a supporting substrate;
at least one power generating element portion disposed on the supporting substrate;
a plurality of first gas channels extending from the base end portion to the leading end portion in the supporting substrate, the first gas channels being disposed at each of the two end portions of the electrochemical cell; and
at least one second gas channel extending from the base end portion to the leading end portion in the supporting substrate, the at least one second gas channel communicating with the plurality of first gas channels at the leading end portion, the at least one second gas channel being disposed in the central portion and between the first gas channels disposed at the two end portions.

9. The electrochemical cell according to claim 8, wherein the at least one second gas channel comprises a plurality of second gas channels, and a total value of flow channel cross-sectional areas of the plurality of first gas channels is larger than a total value of flow channel cross-sectional areas of the plurality of second gas channels.

10. The electrochemical cell according to claim 9, wherein the flow channel cross-sectional area of each of the plurality of first gas channels is larger than the flow channel cross-sectional area of each of the plurality of second gas channels.

11. The electrochemical cell according to claim 9, wherein a number of the plurality of first gas channels is larger than a number of the plurality of second gas channels.

12. The electrochemical cell according to claim 8, wherein the at least one second gas channel comprises a plurality of second gas channels, and a total value of flow channel cross-sectional areas of the plurality of first gas channels is smaller than a total value of flow channel cross-sectional areas of the plurality of second gas channels.

13. The electrochemical cell according to claim 12, wherein the flow channel cross-sectional area of each of the plurality of first gas channels is smaller than the flow channel cross-sectional area of each of the plurality of second gas channels.

14. The electrochemical cell according to claim 12, wherein a number of the plurality of first gas channels is smaller than a number of the plurality of second gas channels.

15. The electrochemical cell according to claim 8, wherein a pitch between adjacent ones of the first gas channels and the second gas channels is larger than a pitch between adjacent ones of the first gas channels.

* * * * *

UNITED STATES PATENT AND TRADEMARK OFFICE
CERTIFICATE OF CORRECTION

| | |
|---|---|
| PATENT NO. | : 11,799,119 B2 |
| APPLICATION NO. | : 17/080994 |
| DATED | : October 24, 2023 |
| INVENTOR(S) | : Noriyuki Ogasawara et al. |

It is certified that error appears in the above-identified patent and that said Letters Patent is hereby corrected as shown below:

On the Title Page

Item (72):
Change "Masayuki Shinkai, Aichi (JP)" to ---Masayuki Shinkai, Ama-gun (JP)---

Signed and Sealed this
Ninth Day of January, 2024

Katherine Kelly Vidal
*Director of the United States Patent and Trademark Office*